A. P. DOUGLAS 2,633,907

APPARATUS FOR TRUING AND TENSIONING
OF SPOKES OF WIRE WHEELS

Filed Feb. 17, 1949

INVENTOR.
ALVIN P. DOUGLAS

BY *Fay, Gobrick & Fay*

ATTORNEYS

April 7, 1953  A. P. DOUGLAS  2,633,907
APPARATUS FOR TRUING AND TENSIONING
OF SPOKES OF WIRE WHEELS
Filed Feb. 17, 1949  5 Sheets-Sheet 4

INVENTOR.
ALVIN P. DOUGLAS
BY Fay, Golrick & Fay
ATTORNEYS

UNITED STATES PATENT OFFICE 2,633,907

APPARATUS FOR TRUING AND TENSIONING OF SPOKES OF WIRE WHEELS

Alvin P. Douglas, Cleveland Heights, Ohio, assignor to The Murray-Ohio Manufacturing Company Application February 17, 1949, Serial No. 76,934

10 Claims. (Cl. 157—1.5)

The present invention is directed to the art of manufacturing wire spoke wheels and more particularly to improved methods and means for effecting the final trueing and tensioning of the three main elements of a wire wheel comprising rim, hub and spokes of the threaded nipple tightening type.

More specifically, my invention is concerned with the provision of a dependable method and means for effecting the final tensioning of light duty wire wheels, such as bicycle and tricycle wheels, and the like where relatively light weight is a factor as distinguished from automobile wheels and kindred heavy duty wheels. My invention contemplates a mode of procedure which permits of the expeditious tightening of all of the relatively light-weight spokes and nipples to a rim formed of relatively thin gauge metal by the application of a multiplicity of power-driven tools or nipple drivers to the nipple heads while yieldingly controlling the direction of extension of the individual nipples relative to the driver heads.

Various practices have been followed in effecting the final tensioning of wire spoke wheels, including the simultaneous application of pneumatically actuated driver tools to all of the spoke nipples in directions coincident with the center lines of the final positions of the spokes as shown, for example, in the Eksergian and Smith Patent 1,980,129. I have found, however, that upon attempting to utilize pneumatic pressure for the simultaneous actuation of a large number of pneumatic motors to simultaneously tension all of the spokes of a light-duty wire wheel, as for example, a bicycle wheel, serious difficulties are encountered. Variation in pressure from one manifold to another and frictional variations in the individual tools are some of the factors quite difficult to control in narrow ranges of inch pound torque effort. These variable factors, while not seriously detrimental in the production of heavy duty wire wheels wherein greater ranges of pneumatic pressure variation can take place during tensioning of the heavier cross-sections of spokes, rims, etc., become serious when it is attempted to use a large number of pneumatically operated motors for the purpose of obtaining simultaneous tightening on all of the spokes of a light duty wheel.

One of the objects of the invention is the provision of a method of simultaneously and uniformly tensioning the spokes of a loosely assembled light-duty wire wheel, wherein the control of the torque effort exerted upon the individual spoke nipples is such that the seating of the nipple heads and the final cinching home thereof upon the rim need not take place simultaneously to produce a substantially uniform tensioning of the spokes.

Another object of the present invention is the provision of a novel method of controlling the individual spokes of a loosely assembled wire spoke wheel whereby the nipples of the loose assembly may be engaged individually by the driver tips of power driven driver units with certainty and the spokes are controlled throughout the turning action of the nipples.

Another object of the invention is to provide an apparatus which will be more sensitive in operation and subject to more accurate regulation in effecting in one general rapid operation the tightening of all of the nipples upon the spokes and rim of a light-duty wire spoke wheel with the characteristics and coordination of the mechanism being such that expeditions loading or inserting of the work into the apparatus and the removal of the completed wheels therefrom is effected.

A still further object of the present invention is the provision of an apparatus for fulfilling the method of final assembly above referred to wherein the hub and rim structures are accurately clamped in final assembly concentric relation and the clamping of the rim is externally effected in such manner as to have its circular form and concentricity relative to the hub preserved during any irregularity in the time of final seating of the nipple heads upon the rim.

A still further object is the provision of an apparatus which will fulfill the foregoing stated objects while the elements thereof are coordinated and controlled in such manner that the apparatus is automatic in its functioning.

Other objects and advantages of the invention will be apparent from the following detailed description of preferred forms of embodiment of the invention, reference being made to the accompanying drawings wherein—

For the purposes of disclosure I show my invention as applied to the manufacture of bicycle wheels and the example selected is that of a front wheel of a bicycle wherein thirty-six spokes usually are present. The spokes are about $\frac{1}{16}$ inch in diameter and the drop center rim is formed up of 18 gauge cold rolled strip about .050″ thick. The spokes are arranged or laced with those spokes having adjacent spoke heads at the hub flange extending outwardly to the rim in substantially opposite directions. The rim ends of the series of spokes extending outwardly from one flange hub are alternately connected to the rim relative to the rim connection of the spokes of the series connected to the other hub flange. A center point of the heads of the nipples of one series of spokes lies in a common plane which is spaced about $\frac{3}{16}$ of an inch from the common plane of a center point of the heads of the nipples of the other series. The two series of nipple holes in the rim are equidistantly spaced from the central plane of the rim. The loci of the spoke perforations formed in the rim, in the present instance, are held constant in production relative to a comparatively large rim perforation through which the inner tube valve stem ultimately extends. This large perforation is utilized as a gauging medium for angularly locating the rim perforations and the nipples preassembled therein relative to the dispositions of the driver heads of the driver units as will be explained.

The general arrangement of the machine comprises a horizontally disposed table which operatively supports a rim and hub chucking or clamping means, a plurality of slide mechanisms for supporting and guiding the individually powered driver units in a substantially radial direction relative to the rim and hub of the product and yieldable spoke guiding and clamping means operable from opposite sides of the preassembled wheel.

Various pneumatic arrangements are utilized for actuating the hub and rim chucking means and for shifting the driver carrying slides in a nipple driving direction and part of the yieldable spoke clamping or guiding means is associated with the hub clamping means so as to be shiftable away from the finished wheel when the hub clamping means is shifted away from the hub.

Referring to the drawings, a pedestal or standard 20, somewhat cylindrical in design, supports the machine bed structure comprising a disk-shaped member 22 and a slideway annulus 24 which are suitably secured to each other and to the pedestal 20. Driver carrying slides 25 are operatively supported in slideway formations 26 substantially radially formed in the top face of the bed annulus 24. The slides 25 are shifted in an inward direction by individual pneumatic motors 28 and in an outward direction by springs 85 in a manner to be described.

The means for chucking or clamping the rim comprises a plurality of radially shiftable clamping jaws 30 which are upward extensions of slide members 31 disposed in radial slideways 32 formed in a ring-shaped member 34 secured to the top of the bed member 24. The slide members 31 also extend and operate in slots formed in a top plate 35 secured to the ring member 34. The top plate has a depending hub structure 36 rigidly fixed thereto for a purpose to be described. Thus, the members 22, 24, 34, 35 and 36 are immobile parts of the bed structure of the machine and when assembled provide an annular space 38, in which is disposed a spirally slotted revolvable chucking plate 40 which engages the rollers 41 depending from the inner ends of the rim chucking slide members 30. I prefer to utilize about twenty of these rim clamping members 30 for reasons to be stated.

Figure 6:
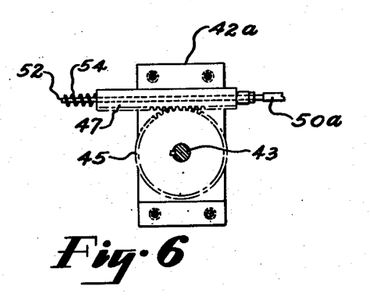
Fig. 6 is a cross-sectional view taken substantially along the line 6—6 of Fig. 1.

To operate the chucking plate 40, I provide pneumatic means and mechanical connections comprising a bearing bracket 42 secured to the under side of the bed member 22, a pinion shaft 43 supported thereby, a disk connection 44 between the upper end of the shaft and the chucking plate 40, a pinion 45 secured to the lower portion of the shaft and a rack 47 for turning the pinion shaft and chucking plate. A pneumatic motor 50 is suitably supported and connected to the rack 47 for turning the chucking plate thereby to cause the rim clamping members to engage the rim substantially simultaneously at a large number of equidistantly spaced points about the circumference of the rim. The lower part 42a of the bearing bracket 42 has a slideway formed thereon for operatively supporting the rack 47 relative to the pinion 45. This slideway member may be bolted to the lower end of the bracket 42, as shown in Fig. 6. The rack is connected to the piston rod 50a, preferably by a rod 52, which extends through a bore formed longitudinally of the rack, an adjustable nut 53 and a pre-compressed spring 54 abutting the nut 53 and an end of the rack.

The wheel hub clamping means comprises a bored anvil member 60 secured to the hub member 36 on the plate 35 and in the example of the drawings this bore is a few thousandths of an inch greater in diameter than the axle spindle of the wheel and bearing preassembly so that the wheel axle end fits into the anvil bore and the bearing cone rests upon the top face of the anvil. The upper axle end fits into a bore formed in the lower end of a vertically shiftable clamping rod 61 which is ruggedly stabilized in its operation by a bearing bracket 62 supported on a bridge structure comprising three bracket arms 64 extending upwardly from the bed structure of the machine. A pneumatic motor 65 is supported by the bracket 62 and has the piston rod 66 thereof connected to the upper end of the hub clamping rod 61. The vertical travel of the motor piston is such that when the clamping rod 61 is retracted ample clearance is afforded to rapidly insert loosely preassembled spoke wheels in the machine and also afford sufficient travel to have the piston rod 66 of the motor also retract upwardly to raise part of a spoke guiding and clamping means which will now be described.

As stated, the clamping and or guiding of the individual spokes is effected by means acting from opposite sides of the series of spokes relative to the wheel assembly and in such a way as to yield to the combined influence of the two series of spokes as the spokes are brought to a straight, tensioned condition by the tightening actions of the respective nipples against the rim. These clamping means are in the form of two cooperating floating rings, disposed to act on the spokes intermediate the hub and rim. One ring 70 is supported directly on the bed member 35 by a plurality of springs 71 and the other ring 72 is lowered and raised by a linkage system associated with the bearing bracket 62 and operated by the piston rod 66. The linkage connections are such that the ring 72 is permitted to float rest upon the series of spokes and the weight thereof is predetermined for purposes to be stated. The linkage for raising ring 72 comprises pairs of pivotally connected links 67, 68, respectively connected to a collar 69 fixed to the piston rod 66 and a collar 69a fixed to the bottom of the bearing bracket 62. The lower pivotal connections of the links 68 to the ring 72 include slots to permit the motion indicated by the dot and dash lines in Fig. 1.

Figure 1:
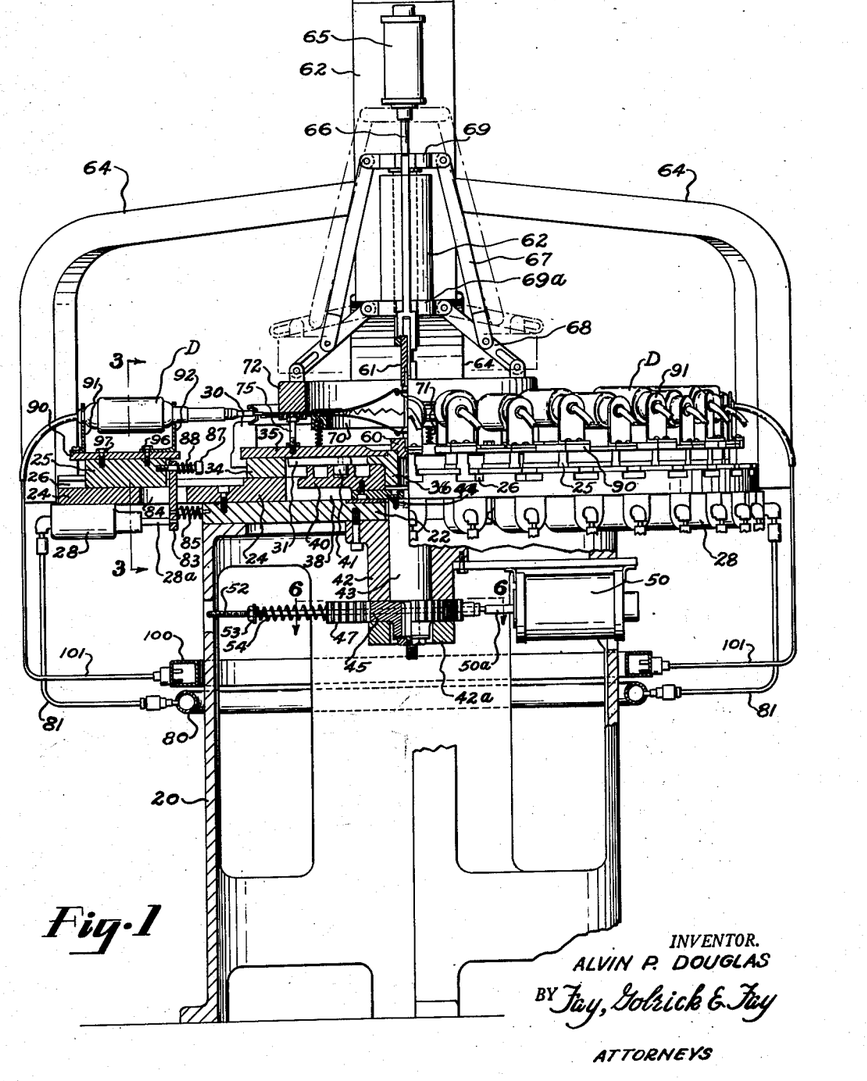
Fig. 1 is an elevational view with part of the apparatus shown in cross-section.
Figure 2:
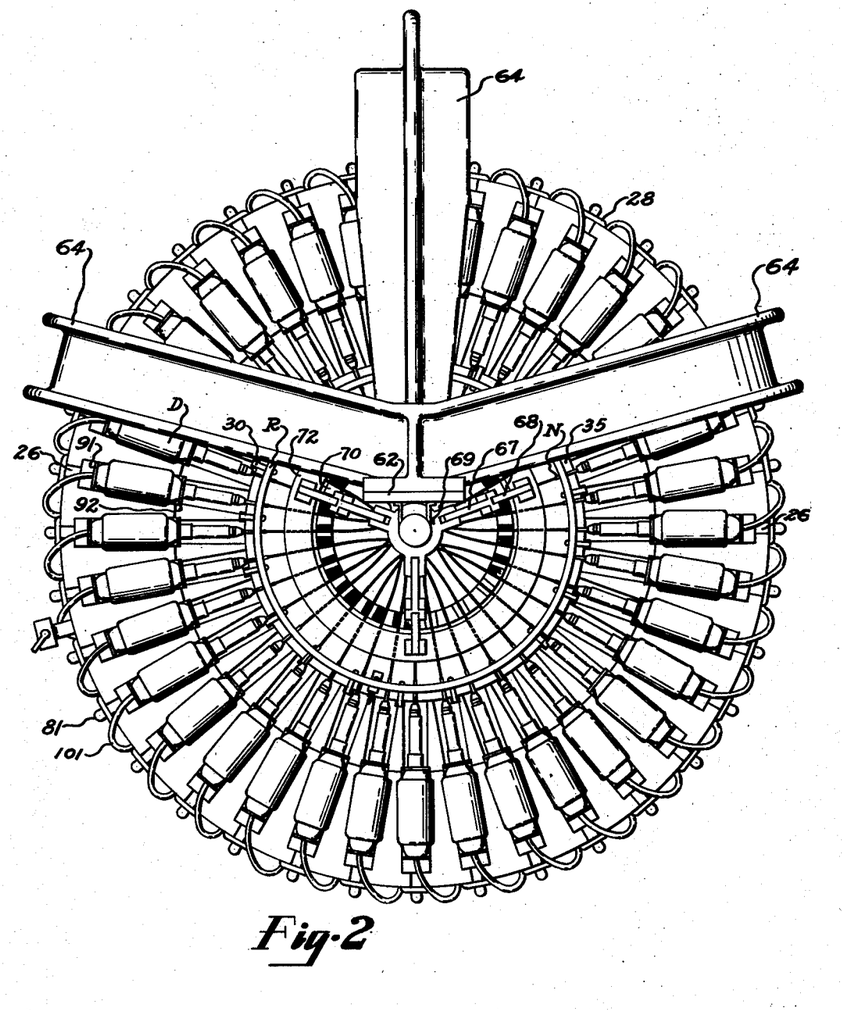
Fig. 2 is a plan view of the machine.
Figure 3:
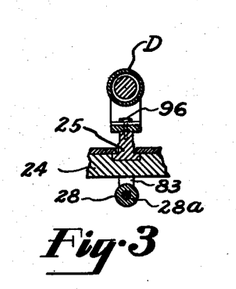
Fig. 3 is a cross-sectional view taken substantially along the line 3—3 of Fig. 1.
Figure 4:
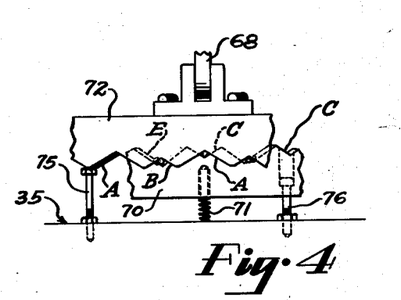
Fig. 4 is a fragmentary view of the spoke clamping and guiding means.
Figure 5:
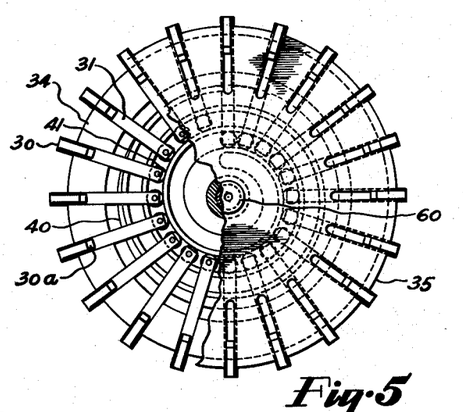
Fig. 5 is a plan view of slideway member and slides therein comprising part of the rim clamping mechanism of the machine.
Figure 9:
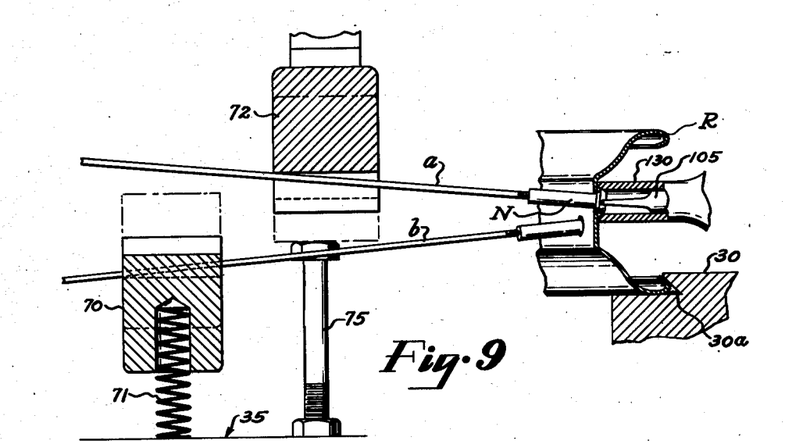
Fig. 9 is a fragmentary view in part of the spoke clamping means and rim clamping means.
Figure 10:
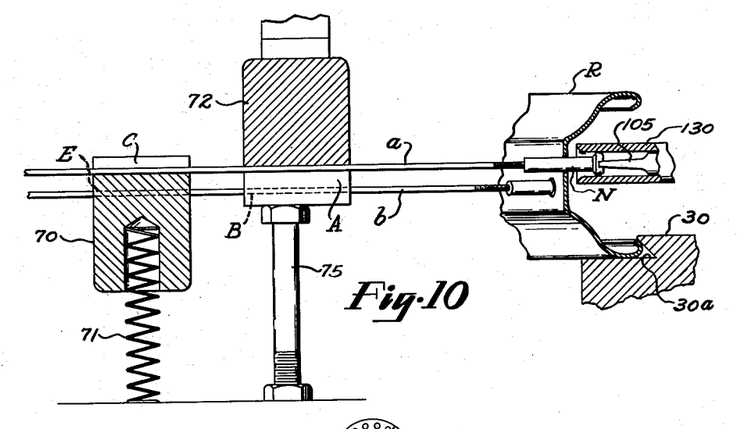
Fig. 10 is a view similar to Fig. 9, but showing the relationship of spokes to the rim before any tightening of the nipples has been effected.

It will be noted in Figs. 1 and 9 that the lower ring 70 is of less diameter than the upper ring 72 and that these rings, while acting upon the spoke series of the preassembled wheel, do not come in contact with each other. Also, it will be noted, as shown in Fig. 4, that a plurality of adjustable stop posts 75 serve to limit the extent the upper ring 72 can drop. Adjustable posts 76 serve to limit the extent of rise of the lower ring 70 under the influence of springs 71. It will also be noted that the lower and upper rings have spoke guideways with spoke camming surfaces formed in such manner that when the hub and rim of the preassembled wheel are clamped the lower and upper rings warp the lower and the upper series of spokes, respectively, whereby the outer parts of the spokes assume a substantially radial relationship to the rim, one series being in a plane spaced about $\frac{1}{16}$ of an inch from the plane of the other series. This condition is more or less diagrammatically shown in Fig. 11. The forces which bring this condition about are the combined strength of the springs 71, less the weight of the lower ring 70, exerted upon the lower series of spokes and the gravitational force due to the weight of the upper ring 72. The slotted connection between ring 72 and links 68 is such that the ring 72 is free of support by the links 68 when the ring is resting on the top series of spokes. It will be apparent that the operation of these spoke positioning members can be regulated whereby the entire series of spoke nipples will be substantially radially disposed relative to the driver units upon initial engagement of the latter with the nipple heads. Thus it will be seen that the driver units can be arranged on the slide mechanisms in two series with the axis of one series of drivers in a common plane and extending radially of the rim and spaced from the plane of the axis of the other series of units a distance of $\frac{3}{16}$ of an inch. The further continued action of the camming surfaces of the spoke engaging rings 70, 72 will be set forth in describing the driver action of the particular electric driver units, which now will be described.

As stated, a separate slide 25, operable in a radial slideway 26, is provided for each electric driver unit D, and a separate pneumatic motor 28, secured to the under side of the bed member 24, is provided for operation of each of the slides 25. As shown in Fig. 1, the pneumatic motors 28 are connected to a common manifold 80 by conduits 81 so that pneumatic pressure operates the motor pistons and their piston rods 28a radially inward. The piston rods 28a are connected to upwardly extending arms 83 which pass upwardly through openings 84 formed in the bed member 24 and terminate adjacent the inner ends of the slide members 25. Spring members 85, disposed between the arms 83 and the bed member 22, serve to shift the piston rods 28a and the arms 83 outwardly when pneumatic pressure is released on the pneumatic motors 28. In each of these slide mechanisms a lost motion connection between the inner end of the driver carrying slide 25 and the arm 83 is provided for purposes to be stated, which comprises a bolt 87 secured to the end of the slide 25 and passed loosely through an opening formed in the upper end of the arm 83. A spring member 88 is disposed between the head of the bolt 87 and the inner face of the upper end of the arm 83.

The electrically powered driver units D may be mounted upon the slides 25 in any convenient manner which will afford some angular adjustment. As shown in Fig. 1, I provide a plate member 90 carrying two yoke-shaped bracket members 91 and 92 which are attached to the ends of the motor housing of the driver units D. If desired, plate member 90 may be secured to the top of the slide 25 by two bolts 96 and 97, the latter bolt extending through an opening in the plate 90, which is arcuate in shape so that the plate may be swung or adjusted about the bolt 96 to align the axis of the driving unit D. A common bus bar housing 100 is provided for attachment of electrical conduits 101 leading upwardly therefrom to each of the electric driver units. It will be seen that as pressure within the pneumatic motor 28 forces the arm 83 inwardly toward the center of the machine spring 85 is compressed thereby, and should there be any obstruction to the inward movement of the head of the driver unit, spring 88 is compressed and thereafter serves to urge the slide 25 inwardly toward the center of the machine. The advantage of the provision of this arrangement will hereinafter become apparent.

Figure 7:
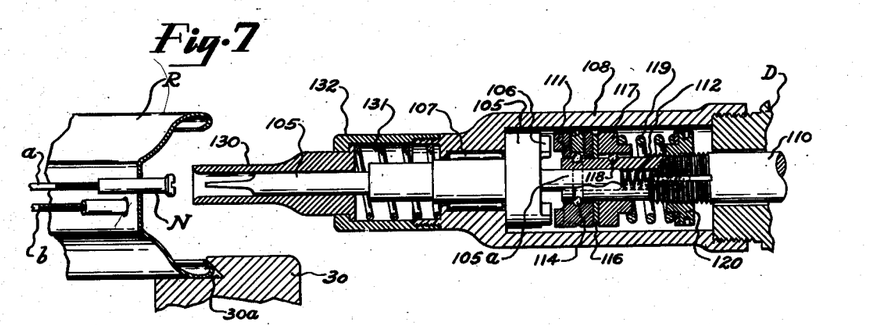
Fig. 7 is a cross-sectional view of a part of the nipple driver mechanism.
Figure 8:
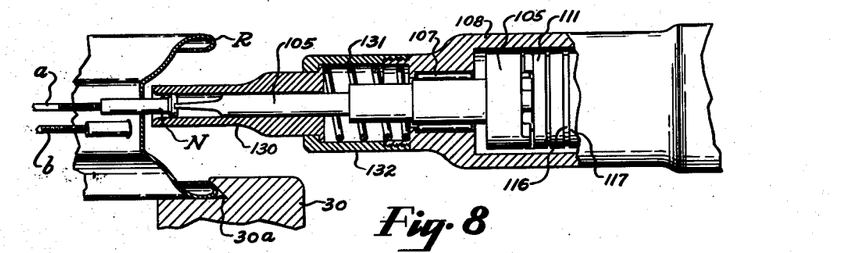
Fig. 8 is a view similar to Fig. 7 with the nipple driver mechanism in driving relation to the nipple head.

The electric driving unit has the motor thereof selected to have a predetermined surplus torque capacity in so far as the work of tightening the spoke nipples is concerned so that variation in speed of the driver head when under load is held at a minimum. To obtain a substantially uniform torque effort by the driver heads of all of the driver units, however, I have provided a special friction or slip clutch mechanism in the torque transmission means between the motor shaft and the driver head, which will now be described with particular reference to Figs. 7 and 8 of the drawings. In those figures, the rim R is shown as being held by the rim chucking members 30 and the spokes with the nipples thereon are represented as having been substantially radially positioned and disposed in common planes by the action of the rings 70, 72. It will be noted that the nipple N has the head thereof disposed a considerable distance from the outer circumferential surface of the drop portion of the rim R and this distance may vary from nipple to nipple on the same preassembly and, of course, from wheel to wheel. As the driver units D are simultaneously shifted toward the rim by action of the pneumatic motors 28 the springs 88 maintain the upper ends of the arms 83 against the ends of the slides 25. However, when the driver tool 105 of the driver unit contacts the end of the nipple as shown in Fig. 8, spring 88 is compressed, since the movement of the pneumatic motor is considerably faster than any advancing turning movement of the driver tip. It is apparent that this flexible feed connection between pneumatic motor and driver unit eliminates the necessity for uniformity of preassembly in so far as the spinning of the nipples upon the spokes is concerned.

I have incorporated a friction slip clutch means in the driver transmission which may be associated with the usual separable tooth clutch common to most driver mechanisms. As shown in Figs. 7 and 8, the driver head mechanism may comprise the tooth clutch formation 106 formed on the inner end of the driver tool 105. The driver tool is supported in a roller bearing 107, mounted within a sleeve-shaped housing 108, attached to the motor housing of the driver unit. The motor shaft 110 has a complementary tooth clutch member 111 loosely retained on the end thereof and adapted to engage the teeth 106 of the driver tool. The driver tool 105 has a stem 105a extending into a bore formed in the end of the motor shaft 110 and this stem is acted upon by a small spring 112 disposed within the bore, which maintains the driver tool 105 out of engagement with the tooth clutch member 111 when the driver tool tip is out of engagement with the nipple head, i. e., the driver tool is not rotating when initially contacting the nipple head.

As stated, the clutch member 111 is loosely mounted upon the end of the shaft 110 and is rotatably supported relative to the shaft by a small ball bearing means 114 on the shaft, which also serves to retain the clutch member 111 axially in position on the shaft. To drive the clutch member 111, I provide a friction clutch disk 116 which is acted upon by a spring-urged friction clutch member 117, spline connected at 118 to the motor shaft. A spring member 119 of pre-compressed value constantly urges the member 114 against disk 116, which in turn is frictionally held against clutch member 111. An adjustable thrust nut 120, mounted on the motor shaft, permits of a refining adjustment to predetermine the inch pounds torque effort which will be exerted by the friction clutch mechanism just described upon the driver tool 105 when the driver tool has turned the nipple end with the head thereof into seated relation with the rim.

A screw head finder 130 is associated with each driver tool 105 and is maintained in an extended position by a spring member 131 disposed within the finder holder 132. The bore of the finder is greater than the diameter of the driving tip of the driver tool 105 and also greater than the diameter of the nipple heads. As the nipple head is driven home the end of the finder contacts the rim. Spring 131 is compressed as the driver unit is moved through its final inward movement but the arrangement is such as not to add load to the driver tool. The spring 131 accordingly is of minimum pre-compressive strength so as not to unduly oppose the effort of the feed spring 88 or unduly interfere with the refinement of the adjustment of the torque effort limiting clutch mechanism comprising the friction disk 116 and its associated mechanism.

Figure 12:
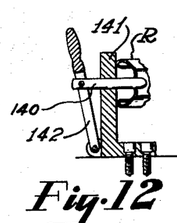
Fig. 12 is a cross-sectional view taken substantially along the line 12—12 in Fig. 11 and showing a plug gauging means adapted to annularly locate the rim in the rim chucking mechanism.

As stated previously, the rims are manufactured in such manner that all of the upper openings will have a fixed and accurate angular spacing relative to the rim valve stem opening and this opening is utilized as a gauging point. A gauging rod 140 is supported by a bracket means 141 and is manually operated by a lever 142 to enter and fit into the valve stem opening of the rim and thus serves to angularly locate all of the nipple openings in the rim relative to the axes of the driver units. The gauging action takes place as the rim is positioned or is resting upon gauging ledges 30a formed on each of the rim chucking jaws 30. The ledges 30a are in a common plane having a definite spaced relation to the plane of the top surface of the anvil 60.

Figure 11:
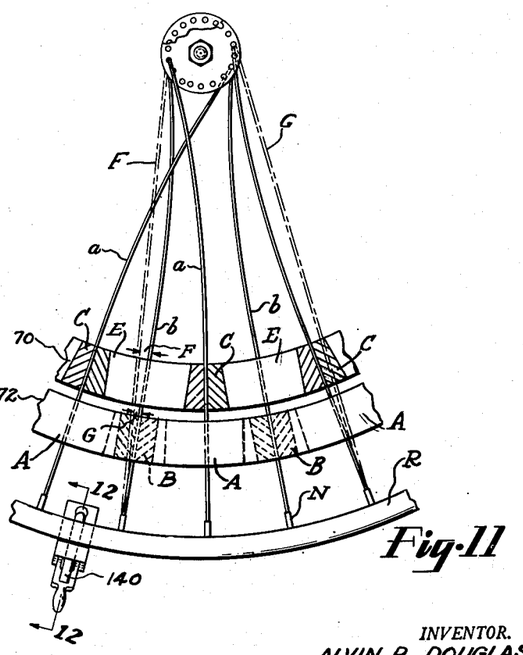
Fig. 11 is a diagrammatic plan view of the disposition of the spokes at the beginning of the tightening operation of the nipples.

In Figs. 11 and 12 the particular shape and action of the spoke guiding or camming and loose clamping surfaces is illustrated more or less diagrammatically. The upper outer ring 72 has a hill and dale formation of major and minor valleys A and B, respectively. The lower, inner ring has a similar formation with the minor valleys C substantially radially coincident or generally in alignment with the major valleys A of the upper ring and with the major valleys E aligned with the minor valleys B of the upper ring. As the spokes of the two series are acted upon by the respective sloping valley wall surfaces of the two rings, as shown in Fig. 11 for a part of the wheel, a crossed pair of spokes $a$—$a$ in the upper series are cammed or bowed away from each other and out of normal straight positions, while the alternating corresponding pair of spokes $b$—$b$ in the lower series are likewise cammed, but toward each other. Thus, the reaction forces due to bending or bowing the spokes oppose each other and no turning forces are exerted on the rings. As the rings are such as to exert sufficient force upon the two series of spokes from opposite sides of the loose assembly, the outer reaches of the spokes are also bent or bowed toward the central plane of the wheel until the outer reaches of one series are substantially disposed in a common plane spaced $\frac{7}{16}$ of an inch from the common plane of the outer reaches of the other series of spokes. Thus two bending actions are exerted on each spoke, one serving to radially dispose the outer reaches of the spokes and the other serving to warp the spokes into a plane common to a series of nipple openings in the rim. The individual spokes are not tightly clamped at the beginning of the nipple turning operation. As the spokes are gradually tightened by the nipple tightening action, the spokes climb up the valley walls of the rings and force the rings outwardly, i. e., the top ring upwardly and the lower ring downwardly. The amount of the spoke displacement is indicated by the dashed lines F and G.

The various associated mechanisms hereinbefore described may be brought into sequential operation by a common pneumatic control means for timing the exertion of pressure in the pneumatic motors 50, 65 and 28 and the releasing and reversing of the same, or individually manually operated valve means may determine the presence of pressure in the motors 50, 65 and the manifold 80, as desired. In either event pressure is present in the motors 50, 65 and 28 during the nipple driving action of the driver units and a reverse pressure in the motors 50 and 65 is required to release and retract the rim and hub clamping means and elevate the top spoke guiding means a sufficient distance to afford ready access to the locus of the wheel.

Briefly, the operation of the apparatus in simultaneously tensioning a loosely preassembled bicycle wheel, as illustrated by way of example, is as follows.

The axle or wheel spindle and cone bearings are snugly in place. The wheel is placed in the machine with one end of the axle in the bore of the anvil 60 and with the rim setting on the ledges 30a of the rim chucking jaws 30. The registering pin 140 is projected into the valve stem opening, thus bringing the spoke nipple openings in alignment with the axes of the series of driving units D. Pneumatic motor 50 is activated to shift the rack 47 and turn pinion 45 and its shaft 43 to revolve the chucking disk 40, thus drawing all of the rollers 41 inwardly and consequently the rim chucking jaws 30. This clamping action fixes the rim concentric relative to the vertical center line of the bore of the hub anvil 60. Motor 65 is actuated to force the hub clamping rod 61 down into engagement with the axle and cone. The hub is thus properly axially spaced relative to the rim by reason of the relation of the top face of the anvil 60 and the ledge surfaces 30a of the rim chucking jaws 30. The lowering of the hub clamping rod causes the lower series of spokes to be cammed or warped by the action of the surfaces of the lower ring 70, and a like action is effected upon the upper series of spokes by the weight and surfaces of the upper ring 72. The upper and lower series of spokes thus have the outer reaches and ends of the spokes leveled to common planes and each is individually warped or bowed so that these leveled reaches or ends extend radially relative to the rim circumference.

The electric driver units are constantly driven at substantially uniform speeds. Pneumatic pressure is admitted to the manifold 80, thus causing all of the pneumatic motors 28 substantially simultaneously to effect inward shifting of the slides 25. All of the driver units likewise are uniformly shifted inwardly until such times as each individual driver tool 105 encounters a nipple head and compresses its spring 112 to the extent that the tooth clutch members 106 and 111 become drivingly engaged. This inward shifting action of the motors 28 is much faster than any screw turning advance the nipples could make. Since the amount of extension of the nipple heads relative to the rim will vary, some of the feed springs 88 will become more compressed than others, and the action of the springs 88 is to maintain an end thrust or axial thrust at the tip of the driver tool 105 throughout the turning action of the driver upon the nipple. The nipple heads are driven thus to a seating relation to the rim. Further driving action upon the seated nipple heads shortens the spokes and as this shortening action takes place the two series of spokes approach a straightened condition while forcing the ring 70 downwardly in opposition to the force of the springs 71 and forcing the ring 72 upwardly against the influence of its weight. Hence the slip clutch mechanism comprising the friction disk clutch member 114 and its associated mechanism is adjusted to the proper inch pound torque effort so that turning action upon the driver tool 105 and nipple will continue to a predetermined extent. Should some spokes lag behind the others during this straightening action the influence of the rings upon the lagging spokes will be lessened. Also, during this spoke straightening action the axes of the nipples shift relative to the axes of the driver tools 105, but the torque effort being exerted, plus the action of the feeder springs 88 maintain the driver tips in position in the slots of the nipple heads. When the nipple heads are driven home upon the rim the friction clutches slip while the electric motors continue to run.

I choose to utilize about twenty rim chucking jaws 30 equidistantly spaced about the rim circumference so that the rim is in substantially uniform radial compression throughout the circumference thereof, whereby momentary unbalanced strains, due to some of the nipple heads being driven home in advance of the others, are met until the remaining nipple heads are driven home.

From the foregoing disclosure it will be seen that the power means for exerting a predetermined torque effort upon the nipple heads, and consequently upon the spokes, is divorced entirely from the force or effort which effects the inward movement of the driver units. The rim, while being supported and chucked or clamped in an offset relation to the cross-sectional structure of the rim, nevertheless is clamped in concentric relation to the hub structure and in such manner as to avoid the creation of ultimate strains in the rim which would cause eventually warping or untrueness in the final rim assembly.

It will be apparent to those skilled in the art that by providing each driver unit with a friction clutch mechanism adjusted to exert a predetermined torque effort upon the nipple head, the relative torque effort of the rotary motors of the driver units do not have to be regulated and controlled other than to have a torque delivering capacity which is amply in excess of the torque delivering capacity of the friction clutches whereby all motors will have substantially uniform speed. Accordingly it will be apparent also that rotary pneumatic motors could be used operating under sufficiently high pneumatic pressure to maintain the excess torque effort which I obtain by using electric powered motors and which excessive torque effort is prevented from reaching the nipple heads by the use of the friction clutches of predetermined torque effort value.

It is to be understood that it is unnecessary to have the axle and cone bearing assembly present in the pre-assembled wheel, for the hub can be centered and the upper and lower edges thereof clamped by using a suitable centering formation on the anvil 60 and on the top hub clamping rod, or, if desired, the centering and clamping can be effected by using suitable upper and lower post formations which would fit the ball races of the hub structure.

I have found it convenient to use a sequential valving means to initiate operation of the pneumatic motors which operate the rim chucking means and the hub and spoke clamping means and I have also determined that it is not of much consequence which of these means is operated first.

The general horizontal arrangement and the characteristics of the coordinated mechanisms used are such that the loosely pre-assembled wire wheel can be quickly loaded or positioned in the machine without undue effort or vexation and the accurate rim and hub gauging and clamping is effected in an almost foolproof manner. The unloading of the completely tensioned and trued wheel likewise is effected with facility. The advantages are important since the actual time consumed by the apparatus in doing the actual work of tensioning the spokes is considerably less than the loading and unloading time.

I claim:

1. Apparatus for the tensioning of a preassembled wire spoke wheel consisting of a hub and rim loosely interconnected by the spokes and spoke nipples of the wheel, the spokes being disposed angularly to the median radial plane of the wheel, said apparatus comprising a machine frame, means mounted on the machine frame for clamping the hub and the rim of the wire spoke wheel in the concentric and axial relations of a finally tensioned wheel, yieldable spoke engaging means for individually displacing the spokes to cause the loose nipples on the outer ends thereof to be disposed substantially radially of the clamped hub and rim and individual power drivers simultaneously shiftable toward the rim for substantially simultaneously effecting tightening of all of the nipples relative to the rim and spokes while the spoke engaging means yieldingly restrains the spokes as the spokes are substantially simultaneously straightened by the tightening actions of the drivers on the nipples.

2. In a machine for effecting the final tensioning of a loosely assembled wire spoke wheel, the combination of a machine frame, hub and rim engaging means associated with the frame for fixedly clamping the hub and rim of the loosely assembled wheel in concentric relation, spoke controlling means comprising two rings each yieldably mounted to the frame to operate from opposite sides of the loosely pre-assembled wheel and each having a series of spoke engaging serrations of alternating depth adapted to cooperatively engage therein the individual spokes to thereby control the direction of extension of each nipple of each spoke, individual power operated drivers of predetermined torque delivering capacity arranged on the machine frame circumferentially of the rim position simultaneously acting on the heads of the nipples, and operating means for shifting the driver heads of the power drivers toward and from the nipples.

3. In a machine of the character described, a machine frame, rim and hub clamping means mounted on the machine frame, spoke engaging means on the frame arranged to be effective to engage yieldably the loose spokes of the assembly, individually powered driver mechanisms mounted on slides carried by the frame and circumferentially arranged about the rim position on the frame whereby a driver unit is adapted to individually engage the nipple head of a spoke while the spoke is steadied by the spoke engaging means and slide actuating means, for simultaneously advancing the slides and the driver units toward the nipple heads including a yieldable connection disposed between the slide actuating means and the slide whereby the rate of movement of the slide relative to the rate of movement of the slide actuating means may vary.

4. In a machine of the character described, a machine frame, rim and hub clamping means cooperatively arranged on the frame to clamp the rim and hub of a loosely assembled wire spoke wheel in final wheel assembly relation, yieldable spoke engaging means effective from opposite sides of a loosely assembled wheel for yieldably engaging individually the loose spokes of the assembly, individually powered driver mechanisms on the frame circumferentially arranged about the rim for individually engaging the nipple head of each spoke while the spoke is steadied by the yieldable spoke engaging means, means including a yieldable connection for simultaneously advancing the driver units toward the nipple heads, a yieldable nipple head finder associated with the driver tip of the powered driver and a torque effort limiting clutch mechanism in each driver unit to uniformly tension the spokes against the influence of the yieldable spoke engaging means.

5. In a mechanism of the character described, a machine frame, rim and hub clamping means arranged on the frame to clamp the rim and hub of a loosely assembled spoke wheel in a final assembly concentric relation, spoke engaging means arranged on the frame at one side of the series of spokes of the loose wheel assembly when held by the rim and hub clamping means, a second spoke engaging means arranged on the frame on the opposite side of the loose spoke assembly relative to the first stated spoke engaging means, operating means for effecting relative movement between the two spoke engaging means thereby to cause engagement of the loose spokes from opposite sides of the wheel, individually powered driving mechanisms circumferentially arranged about the rim for individually engaging the nipple head of each spoke while the spoke is steadied by the spoke engaging means and means for simultaneously advancing the driver units toward the nipple heads.

6. In a mechanism of the character described, a machine frame, rim and hub clamping means arranged on the frame to clamp the rim and hub of a loosely assembled spoke wheel in a final assembly concentric relation, spoke engaging means arranged on the frame at one side of the series of spokes of the loose wheel assembly when held by the rim and hub clamping means, a second spoke engaging means arranged on the frame on the opposite side of the loose assembly relative to the first stated spoke engaging means, pneumatically operated means for effecting relative movement between the two spoke engaging means thereby to cause engagement of the loose spokes from opposite sides of the wheel, electric power driven driver mechanisms circumferentially arranged about the rim for individually engaging the nipple head of each spoke while the spoke is steadied by the spoke engaging means and pneumatically operated means for simultaneously advancing the driver units toward the nipple heads.

7. In a mechanism of the character described, a machine frame, rim and hub clamping means arranged in the frame to clamp the rim and hub of a loosely assembled spoke wheel in a final assembly concentric relation, spoke engaging means arranged on the frame at one side of the series of spokes of the loose wheel assembly when held by the rim and hub clamping means, a second spoke engaging means arranged on the frame on the opposite side of the loose assembly relative to the first stated spoke engaging means, operating means for effecting relative movement between the two spoke engaging means thereby to cause engagement of the loose spokes from opposite sides of the wheel, power driven driver mechanisms circumferentially arranged about the rim and radially shiftable toward the rim for individually engaging the nipple head of each spoke while the spoke is steadied by the spoke engaging means and means for radially advancing the driver units toward the nipple heads.

8. In a machine for effecting final uniform tensioning of all of the spokes of a bicycle wheel in a substantially simultaneous manner, the combination of clamping means for holding the hub and rim structures concentric relative to each other, a plurality of power driven spoke nipple drivers operatively arranged about the perimeter of the rim position when a loosely assembled wheel is held by said clamping means, there being a motor driven driver unit mounted on a slide to the frame for each spoke nipple, a nipple driver tip, a torque limiting clutch mechanism connecting the driver tip to the motor for delivering a predetermined torque effort to the driver tip when the nipple head is driven home upon the rim, the operative arrangement for the driver units comprising means for advancing the units toward the rim including a lost motion connection to the slide whereby the driver tips may be substantially uniformly pressed against the nipple heads, and means for steadying the spokes of the loose spoke assembly while the driver tips are pressed against the nipple heads.

9. In a machine for effecting final uniform tensioning of all of the spokes of a bicycle wheel in a substantially simultaneous manner, the combination of clamping means for holding the hub and rim structures concentric relative to each other, a plurality of power driven nipple drivers operatively arranged about the perimeter of the rim position when a loosely assembled wheel is held by said clamping means, there being an electric motor driven driver unit for each spoke nipple, a nipple driver tip, a torque limiting means drivingly interposed between the driver tip and the electric motor for delivering a predetermined torque effort to the driver tip when the nipple head is driven home upon the rim and the operative arrangement for the driver units comprising slide means for supporting and advancing the units toward the rim including a lost motion connection whereby the driver tips may be substantially uniformly pressed against the nipple heads.

10. In a mechanism of the character described, a machine frame, rim and hub clamping means arranged on the frame to clamp the rim and hub of a loosely assembled spoke wheel in a final assembly concentric relation including gauging surfaces for determining the final axial relationship of the hub and rim, means acting in the valve stem opening of the rim for angularly locating the spoke openings of the rim, yieldable spoke engaging means arranged on the frame at one side of the series of spokes of the loose wheel assembly when held by the rim and hub clamping means, a second yieldable spoke engaging means arranged on the frame on the opposite side of the loose assembly relative to the first stated spoke engaging means, operating means for effecting relative movement between the two spoke engaging means thereby to cause engagement of the loose spokes from opposite sides of the wheel, power driven driver mechanisms circumferentially arranged about the rim for individually engaging the nipple head of each spoke while the spoke is steadied by the yieldable spoke engaging means and means for simultaneously advancing the driver units toward the nipple heads.

ALVIN P. DOUGLAS.

REFERENCES CITED

The following references are of record in the file of this patent:

UNITED STATES PATENTS

| Number | Name | Date |
|---|---|---|
| 569,888 | Sanderson | Oct. 20, 1896 |
| 1,496,058 | Kuniholm | June 3, 1924 |
| 1,980,129 | Eksergian et al. | Nov. 6, 1934 |
| 2,422,593 | Smith | June 17, 1947 |

FOREIGN PATENTS

| Number | Country | Date |
|---|---|---|
| 481,236 | Germany | Aug. 19, 1929 |